J. J. WETMORE.
AXLE-LUBRICATOR.
No. 183,238.            Patented Oct. 10, 1876.
Fig. 1
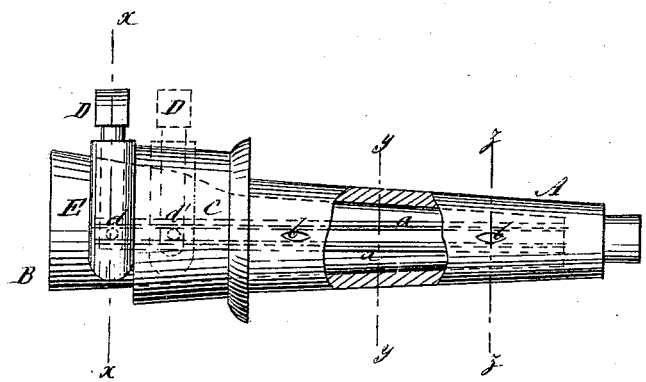
Fig. 2      Fig. 3      Fig. 4
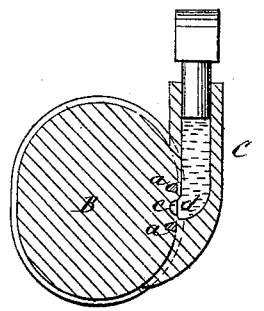 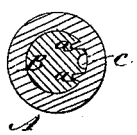 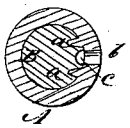
WITNESSES:          INVENTOR:
C. Neveux          J. J. Wetmore
John Goethals       BY
                              ATTORNEYS.
JAMES R. OSGOOD & CO. BOSTON.

UNITED STATES PATENT OFFICE.

JOHN J. WETMORE, OF SHABONIER, ILLINOIS.

IMPROVEMENT IN AXLE-LUBRICATORS.

Specification forming part of Letters Patent No. 183,238, dated October 10, 1876; application filed July 15, 1876.

*To all whom it may concern:*

Be it known that I, JOHN J. WETMORE, of Shabonier, in the county of Fayette and State of Illinois, have invented a new and Improved Axle-Lubricator, of which the following is a specification:

Figure 1 is a side elevation with a portion broken away to show its internal construction. Fig. 2 is a transverse section on line $x\ x$ in Fig. 1. Fig. 3 is a section on line $y\ y$ in Fig. 1. Fig. 4 is a section on line $z\ z$ in Fig. 1.

Similar letters of reference indicate corresponding parts.

My invention consists in combining an oil-chamber having a close-fitting plunger with a skein having an internal longitudinal groove and side apertures communicating with the surface of the bearing.

A is a skein, fitting on the axle B, and is provided with an oil or grease cup, C, and the internal ribs $a$ and apertures $b\ b$. A groove is cut in the axle for each of the ribs $a$. A groove, $c$, is also cut in the axle between the ribs $a$, and extends from the grease-cup C to the farthest aperture $b$. A passage, $d$, connects the grease-cup C with the groove $c$. D is a plunger, armed with a rubber or leather packing at its lower end, and placed in the grease-cup C.

When the skein is made without the oiling attachment, the grease-cup may be attached to the axle, as shown at E, and the grease forced through a channel in the axle and through holes drilled in the skein. Either oil or axle-grease may be used and forced into the bearing by the plunger D. The ribs $a$ prevent the grease from following the inside of the skein around on the axle.

I am aware that it is not new to make an oil-groove longitudinally between a skein and the journal, so that the lubricant will ooze through one or more holes to the surface, wherefrom it will be distributed over the frictional surfaces by the rotation of the hub.

Having thus described my invention, I claim as new and desire to secure by Letters Patent—

The combination, with axle having groove $c$, receiving lubricant through a channel, $d$, of the oil-cup, of the skein A, having ribs $a$, that fit closely into corresponding grooves of axle, as and for the purpose specified.

JOHN J. WETMORE.

Witnesses:
M. W. RANDALL,
E. L. MILLER.